United States Patent [19]

Tullio

[11] Patent Number: 4,657,222
[45] Date of Patent: Apr. 14, 1987

[54] VALVE

[75] Inventor: John A. Tullio, Erie, Pa.

[73] Assignee: South Shore Manufacturing, Inc., Erie, Pa.

[21] Appl. No.: 802,236

[22] Filed: Nov. 27, 1985

[51] Int. Cl.⁴ ............................................. F16K 5/16
[52] U.S. Cl. ..................... 251/56; 251/162; 251/294; 251/309
[58] Field of Search ............... 251/56, 160, 161, 162, 251/163, 203, 309, 294, 58

[56] References Cited

U.S. PATENT DOCUMENTS

| | | | |
|---|---|---|---|
| 249,170 | 11/1881 | Grannan | 251/58 X |
| 715,578 | 12/1902 | Heston . | |
| 1,650,312 | 11/1927 | Wildin et al. | 251/163 |
| 1,805,668 | 5/1931 | Kelley . | |
| 2,414,966 | 1/1947 | Melichar | 251/160 |
| 2,529,544 | 11/1950 | Ebert | 251/162 |
| 3,153,317 | 10/1964 | Manor et al. | 60/6 |
| 3,206,163 | 9/1965 | Freed | 251/309 |
| 3,685,793 | 8/1972 | Szumilas et al. | 251/164 |
| 3,799,499 | 3/1974 | Shur | 251/309 X |
| 3,888,458 | 6/1975 | Bubniak et al. | 251/118 |
| 4,225,110 | 9/1980 | Akkerman et al. | 251/58 |
| 4,339,110 | 7/1982 | Ortega | 251/309 |

FOREIGN PATENT DOCUMENTS 651444  9/1937  Fed. Rep. of Germany ...... 251/161

Primary Examiner—Martin P. Schwadron
Assistant Examiner—Stephen M. Hepperle
Attorney, Agent, or Firm—Webb, Burden, Robinson & Webb

[57] ABSTRACT

A valve comprising a valve body having a tapered conical bore and an opposed inlet and outlet openings. A tapered cage abuts the conical bore. The cage is designed for easy replacement. A stopper is arranged within the cage. The stopper has a control vane extending radially outward from the stopper axis. Conical plugs are fixed at each axial end of the control vane. Biasing means urge the stopper toward the small end of the conical bore. A cam surface and cam follower lift the stopper axially away from the small end of the conical bore when it is rotated away from a closed position.

15 Claims, 4 Drawing Figures

VALVE

FIELD OF THE INVENTION

This invention pertains to quarter-turn valves for controlling the flow of fluids or slurrys having application, for example, in the chemical and petroleum refining industries.

BACKGROUND OF THE INVENTION

It is an object according to this invention to provide a quarter-turn control valve that can be operated with low torques.

It is a further object of this invention to provide a valve structure that is easily customized and can thus provide (a) full flow typical of butterfly valves, (b) variable flow control typical of globe valves, (c) manual operation in an on/off mode similar to ball valves, and (d) programmable turn down relative to rotation position.

It is yet a further object according to this invention to provide an efficiently sealing valve (i.e., tight shut-off capability) even when used with slurry applications.

It is a still further object of this invention to provide a valve that is economical to manufacture as all metal parts can be cast and/or machined fully automatically and the same parts are interchangeable from valve assembly to valve assembly. Interchangeability of parts facilitates repair and minimizes downtime.

SUMMARY OF THE INVENTION

Briefly according to this invention, there is provided a quarter-turn control valve comprising a valve body having walls defining a conical bore about a bore axis, sometimes referred to as an axis of revolution. The conical bore has larger and smaller axial ends. The larger axial end has a large opening therein. Opposed inlet and outlet openings are arranged about a flow axis which axis is substantially perpendicular to the bore axis. A feature of this invention is a removable and replaceable cage defined by a conical interior and a conical exterior surface. The cage is arranged to abut the conical bore of the valve body. The cage is, of course, provided with opposed openings that open, at least in part, upon the opposed inlet and outlet openings of the valve body. A stopper is arranged within the cage to turn on an axis aligned with the bore axis. The limiting exterior configuration of the stopper is a conical surface that abuts the interior conical surface of the cage. The stopper comprises a control vane extending radially outward from the stopper axis. The control vane may comprise a plate having two edges that are conical surfaces. The edges of the vane may be brought into sealing relationship with the interior surface of the cage. In other words, the opposed edges of the vane are arranged to abut the interior conical surface of the cage at all points on a conceptual plane including the bore axis and being substantially perpendicular to the flow axis where the conceptual plane intersects the interior conical surface. The stopper comprises larger and smaller conical plugs at each axial end of the control vane. Preferably the plugs are disc-shaped having conical edges. The conical plugs are arranged to make a sealing contact with the interior conical surface of the cage. The sealing contact comprises abutment of the edges of the conical plugs with the cage surface at all points on conceptual sealing planes perpendicular to the bore axis where the planes intersect the interior conical surface. A drive stem extends axially away from the one conical plug and a balancing stem extends axially away from the other conical plug.

A bonnet closes the large opening at one axial end of the conical bore while permitting the drive stem to pass therethrough. The drive stem may be rotated for positioning the vane relative to the valve body. A cap is provided for closing the axial end of the conical bore opposite the bonnet. Biasing means are provided for urging the stopper toward the small end of the conical bore. Preferably, the biasing means comprises a disc spring secured between the valve body and the balancing stem within the interior of the cap.

A feature of this invention is a cam surface and cam follower for shifting the stopper axially away from the small end of the conical bore when it is rotated away from the closed position. (In the closed position, the control vane is substantially perpendicular to the flow axis.) Preferably the cam surface is associated with the bonnet and the cam follower is associated with the drive stem external of the valve body.

Preferably annular recesses are provided in the conical plugs on the conical edges thereof. Each recess is arranged to receive a resilient material such as an O-ring. When the stopper is shifted toward the smaller end of the conical bore, the two O-rings associated with the conical plugs are compressed preventing axial flow thereby.

A valve according to this invention can be a hard seat or a soft seat valve depending upon the requirements of the application. Soft seat valves are more easily made to control leakage. According to a preferred embodiment of this invention, recesses are provided in the interior wall of the cage on opposite sides thereof. The recesses are arranged to include a conceptual sealing plane passing therethrough. The sealing plane also passes through the axis of the stopper and the conical edges of the vane when the vane is in the closed position. A resilient material is secured to the recesses such that when the stopper is brought to the closed position, the edges of the vane abut the resilient sealing material. When the stopper is then urged toward the smaller end of the conical bore the no-leak seal is effected.

According to a preferred embodiment of this invention, a sheave is secured to the drive stem outside of the valve body. A cable is arranged to be guided by the sheave and is fixed to the perimeter thereof at one point. An actuator means comprising a pneumatic or hydraulic cylinder is secured to one end of the cable, the other end of the cable is connected to another cylinder or to a spring. The cable may be drawn one way or the other thus rotating the sheave and the valve stem.

An important feature of this invention is the removability and replaceability of the cage. The cage is provided with axial symmetric openings therein which, at least in part, face upon the opening in the valve body. The openings in the cage may be customized to cooperate with the vane in providing the desired flow area for a given degree of rotation of the stopper.

THE DRAWINGS

Further features and other objects and advantages of this invention will become clear with the following detailed description made with reference to the drawings in which FIG. 1 is a section view of a valve body according to this invention without the stopper assembly positioned therein;

DESCRIPTION OF THE PREFERRED EMBODIMENT

Figure 1:
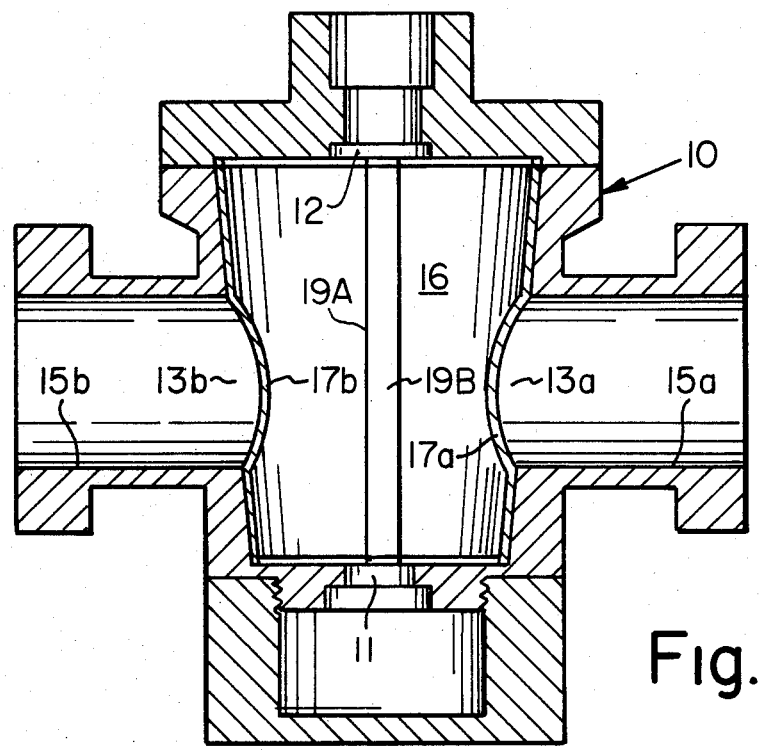

Referring to FIG. 1, a valve body 10 comprises a casting or block having a conical bore. The conical bore has an axis (vertical in FIG. 1) about which the bore is symmetrical. At the smaller end of the bore, a small axial opening 11 is provided and likewise at the larger end of the bore a very large axial opening 12 is provided. The taper of the bore is preferably 3 to 10 degrees and most preferably 5 degrees. Inlet 13a and outlet 13b openings are provided on opposite sides of the conical bore. Since the valve is most advantageously bidirectional, designation of the openings 13a, 13b as either inlet or outlet is arbitrary. The openings are generally aligned with the flow axis that is generally perpendicular to the axis of the conical bore. Bosses 15a, 15b extend outwardly away from the openings 13a, 13b to enable the valve to be connected in the fluid conduit or pipe that it is to control. The specific dimensions of the valve depend upon the size of the fluid conduit being controlled. The bosses 15a, 15b, will generally have an inner diameter near that of the fluid conduit, say, 2 to 12 inches. The axial length of the conical bore is larger than the inner diameter of the bosses and is preferably 1.5 to 2.5 times the inner diameter of the bosses. The means diameter of the conical bore is greater than the inner diameter of the bosses and preferably 1.5 to 2.5 times the inner diameter of the bosses.

A conical cage or sleeve 16 abuts the conical bore. The cage is provided with substantially the same taper as the conical bore and can thus be dropped into position from the larger axial end of the bore. The cage has interior and exterior conical surfaces which preferably have the same taper angle as the conical bore. The thickness of the cage may vary, say ⅛ to ⅜ inch. The cage has opposed openings 17a, 17b which may be arranged to overlap the inlet and outlet openings of the conical bore. It is not necessary that the openings in the cage match the openings in the conical bore. On opposite sides of the cage 16 there are grooves 19A for receiving a soft seat or seal 19B.

Figure 2:
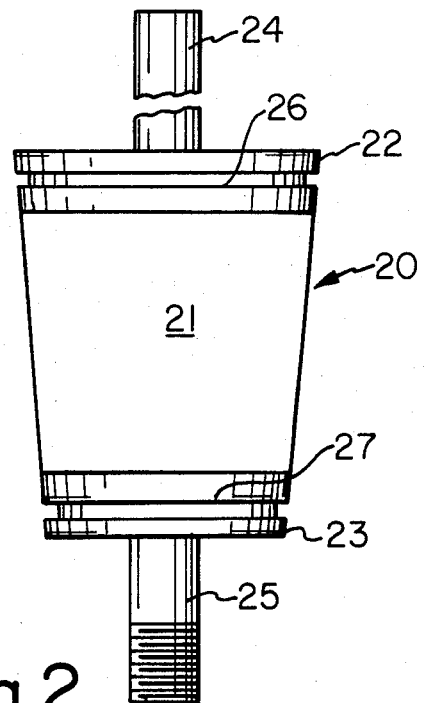
FIG. 2 is a view of the lower portion of the stopper assembly.

Referring to FIG. 2, the stopper 20 will now be described. The stopper body has an external configuration that is limited by the interior surface of the cage. It comprises a vane 21 between larger 22 and smaller 23 conical plugs. A drive stem 24 extends axially away from the larger plug 22 and a balancing stem 25 extends axially away from the smaller plug 23.

The edges of the vane 21 and the edge surfaces of the larger and smaller conical plugs are all defined by the same surface of revolution about the axis of the stopper. They are thus conical surfaces. The edges of the upper and lower sections of the stopper have grooves 26 and 27 therein for receiving resilient seals 28 and 29 (see FIG. 3) such as an O-ring.

Figure 3:
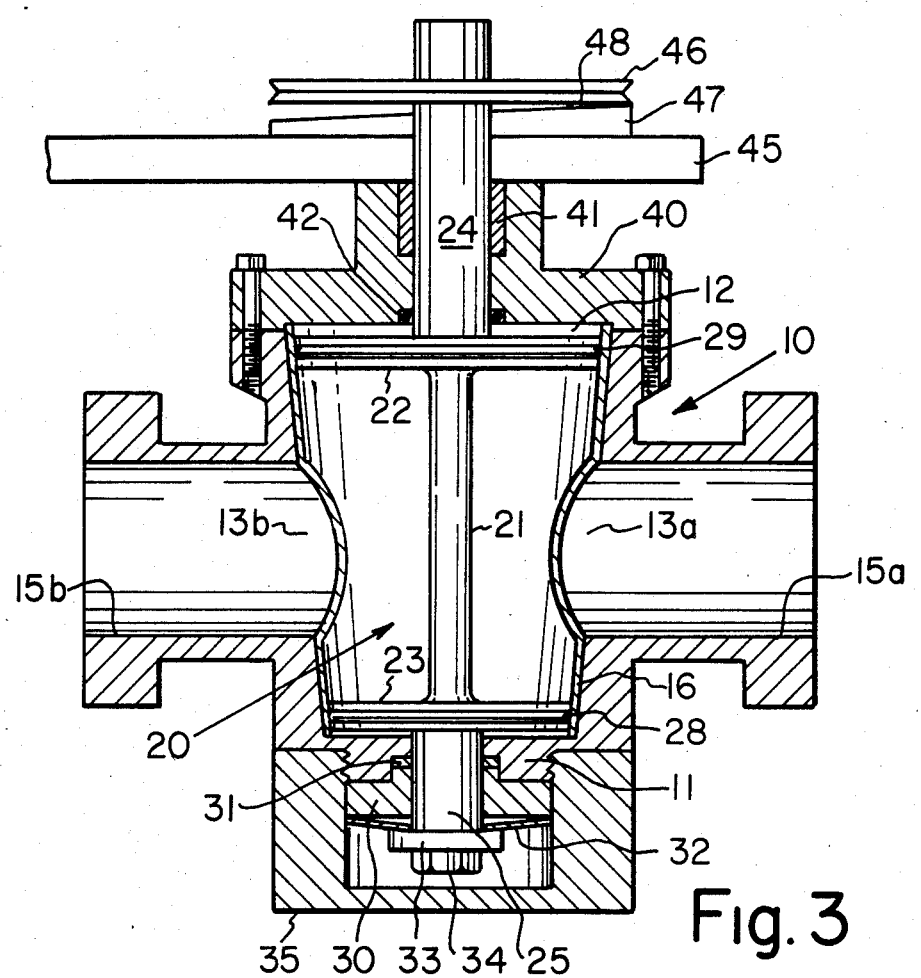
FIG. 3 is a section view of a valve body with the unsectioned stopper assembly in position.

Referring to FIG. 3, the valve according to this invention is shown in section with the stopper in place (in FIG. 3, the edge of the control vane faces out whereas in FIG. 2 a face of the vane faces out). The balancing stem 25 is journaled in an opening in the valve body and passes through a spacer ring 30. The valve body and spacer ring 30 interfit to form an annular space for receiving seal 31. A disc spring 32 is placed around the balancing stem and is secured by an annular spacer 33 and a nut 34. When the nut is tightened down, the casing, seal 31, annular spacer 33 and disc spring 32 are compressed together. The stopper is thus biased toward the small end of the conical bore. Cap 35 protects the balancing stem 25 and the directly attached components.

A bonnet 40 covers the large axial end opening 12. It has a bore through which the drive stem 24 passes and supports a safety packing 41. The bonnet may be held in place by bolts passing through flanges integral with the valve body. Preferably an annular recess is provided to permit an O-ring 42 to be positioned around the base of the drive stem 24. Mounted to the bonnet 40 is drive mounting plate 45. It serves to position and hold the vane actuation mechanism to be described. Attached to the drive stem 24 is sheave 46. Between the plate 45 and the sheave 46 is a cam and cam follower. The cam may comprise a helical surface 47 secured to the face of the plate 45 with its axis aligned with the axis of the stopper and conical bore. The cam follower may be a ball bearing 48 held on the underside of the sheave. Preferably circular grooves are arranged in the cam surface for receiving the ball bearing 48. Thus as the stopper rotates, the cam 47 and spring 32 move the stopper in either axial direction. According to one embodiment, the cam surface provides a lift of the stopper away from the small end of the conical bore as it is rotated from the closed position. A suitable lift is 0.010 inch. The cam surface may be configured to drop the cam back toward the small end of the bore when it reaches the full open position (with the vane substantially parallel to the flow axis). This is desirable where the valve remains full open for long periods as it will recompress the O-rings 28, 29. Note that O-ring 42 is compressed when O-rings 28, 29 are released, thus packing 41 is merely a safety seal.

Figure 4:
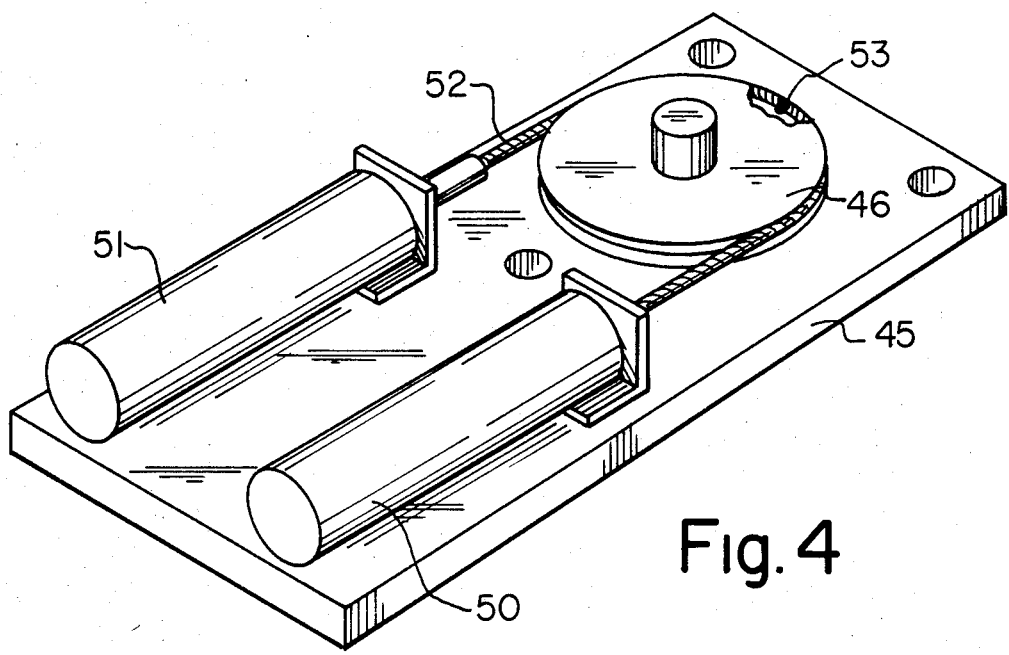
FIG. 4 is a perspective view of the actuator mechanism according to this invention.

Referring now to FIG. 4, the top of plate 45 is shown in perspective. Spring chamber 50 and hydraulic or pneumatic drive cylinder 51 are mounted to the plate. A cable 52 is secured at one end to the spring (not shown) in the spring chamber and on the other end to the piston (not shown) of the drive cylinder. The cable 52 wraps around the sheave 46 and is secured to the sheave by a clamp 53. It would be possible to replace the spring chamber 50 with another drive cylinder. The actuator (comprising spring, cable, and drive cylinder) can be arranged to fail on either the open or closed position of the valve at the election of the designer by simply switching positions of the spring and drive cylinder. By increasing the sheave diameter of the torque on the drive stem can be increased. Of course, the length of the stroke of the drive cylinder will have to be increased to turn the stopper through the same angle (say, 90 degrees). The alignment of the cylinders is not critical and the positioning of them may vary considerably with no effect upon the operation of the valve.

OPERATION

When a signal is received by the cylinder 51, the cable is drawn and the sheave is caused to rotate. Rotation of the sheave rotates the drive shaft and the stopper. Rotation due to the cam action causes the axial movement of the stopper away from the smaller end of the conical bore. A climb of 0.010 for example, would allow the relaxation of the O-ring seals 28, 29 and rotation of the stopper with low friction and thus low torque. As the stopper is rotated, the control vane turns in the cage and the opening on opposite sides of the cage increase in size allowing flow through the valve. The flow provided is straight through flow which is desired in most fluid systems.

When closing the valve, the operation is reversed with one exception. A spring inside the spring chamber pulls the cable. When the opening forces are reduced, the cable pulls the control vane in the closing direction. When the cam is deactivated by the rotation, the control vane drops into the taper of the cage causing the tight sealing or sealing at acceptable leakage rates. During closing, the sealing surface is cleaned by a velocity increase as the valve closes. Because the vane closes down in the seat after rotation, the velocity can be predetermined and the clearance adjusted. The adjustment can also be made while the valve is in service by simply increasing the lift of the cam.

When valve is closed, the packing 41 around the stem has no internal pressure acting on it which prevents leakage and failure of the equipment during shut-off conditions. Also, when the valve is required to be open for long periods of time, the cam can be designed so that the vane (stopper) will drop in the cage which will draw the upper and lower O-rings into compression on the interior of the cage. This reduces the pressure on the packing and increases the life and operation of the valve.

Having thus described my invention with the detail and particularity required by the Patent Laws, what is desired protected by Letters Patent is set forth in the following claims.

I claim:
1. A valve comprising:
   (a) a valve body having walls defining a tapered conical bore and bore axis, said bore having large and small axial end openings and opposed inlet and outlet openings, said inlet and outlet openings arranged about a flow axis substantially perpendicular to the bore axis,
   (b) a tapered cage comprising conical interior and exterior surfaces, said exterior surface sized to abut the conical bore of the valve body, said cage being designed for easy replacement, said cage having opposed openings that open, at least in part, upon the opposed inlet and outlet openings,
   (c) a stopper arranged to turn on an axis aligned with the bore axis and arranged within the cage and having, as a limiting exterior configuration, a conical surface that abuts the interior conical surface of the cage, said stopper having a control vane extending radially outward from the stopper axis, said vane having opposed edges arranged to abut the interior conical surface of the cage at all points on a first sealing plane including the bore axis, said stopper comprising larger and smaller conical plugs at each axial end of the control vane, said conical plugs having edges arranged to abut the interior conical surface of the cage at all points on second and third sealing planes perpendicular to the bore axis where they intersect the interior conical surface, said stopper having a drive stem extending axially away from the one conical plug and a balancing stem extending axially away from the other conical plug.
   (d) a bonnet fixed relative to the valve body for closing of an axial end of the conical bore while permitting the drive stem to pass therethrough,
   (e) cap means for closing the axial end of the conical bore opposite the bonnet means,
   (f) biasing means for urging the stopper toward the small end of the conical bore,
   (g) means for rotating the stopper fixedly secured to the stem emerging from the bonnet, and
   (h) means comprising a cam surface and cam follower for lifting the stopper axially away from the small end of the conical bore a controlled distance when it is rotated away from a closed position where the control vane is substantially perpendicular to the flow axis.

2. A valve according to claim 1 further comprising annular recesses in the edges of the larger and smaller conical plugs, each recess arranged with one of said second and third sealing planes passing therethrough, and seals comprised of a resilient material secured in the said recesses.

3. A valve according to claim 2 wherein the seals comprise O-rings.

4. A valve according to claim 1 which recesses are provided in the interior wall of the cage on opposite sides thereof, said recesses arranged with the said first sealing plane passing therethrough, and seals comprised of a resilient material secured in said recesses.

5. A valve according to claim 1 wherein the cam surface is defined by an attachment to the exterior of the bonnet.

6. A valve according to claim 1 wherein the bonnet closes the large axial end opening of the conical bore and the cup closes the small axial end opening of the conical bore.

7. A valve according to claim 1 wherein the biasing means is secured between the valve body and the balancing stem and is positioned within the interior of said cap.

8. A valve according to claim 1 further comprising a sheave secured to said drive stem outside of said valve body, a cable which is arranged to be guided by said sheave fixed to the perimeter thereof and actuator means to draw the ends of the cable to rotate the sheave, drive stem and control vane.

9. A valve according to claim 1 wherein the openings in the cage are substantially symmetrical about the bore axis and have a programmed opening that differs from the openings of the inlet and outlet.

10. A valve according to claim 1 wherein an O-ring seal is provided about the drive stem abutting the stopper and adjacent the bonnet such that the O-ring is brought into compression when the stopper is shifted axially away from the small end by the cam action.

11. A valve according to claim 1 wherein the cam surface is associated with the bonnet.

12. A valve according to claim 3 wherein the cam surface is configured such that the stopper is axially shifted at least about 0.010 inch to allow relaxation of the O-ring seals during the opening of the valve.

13. A valve according to claim 1 wherein the taper of the conical bore is between 5 and 10 degrees.

14. A valve according to claim 13 wherein the taper of the cages is between 5 and 10 degrees.

15. A valve according to claim 1 wherein the tapers of the bore and cage are about 5 degrees.

* * * * *

UNITED STATES PATENT AND TRADEMARK OFFICE
CERTIFICATE OF CORRECTION

PATENT NO. : 4,657,222

DATED : April 14, 1987

INVENTOR(S) : John A. Tullio

It is certified that error appears in the above-identified patent and that said Letters Patent is hereby corrected as shown below:

Column 3 Line 36 "means" should read —mean—.

Column 4 Line 14 "tha" should read —the—.

Claim 4 - Column 6 Line 26 "which" should read —wherein—.

Signed and Sealed this

Tenth Day of November, 1987

Attest:

DONALD J. QUIGG

*Attesting Officer*   *Commissioner of Patents and Trademarks*